(12) United States Patent
Bossler et al.

(10) Patent No.: US 8,206,592 B2
(45) Date of Patent: Jun. 26, 2012

(54) TREATING ACIDIC WATER

(75) Inventors: John F. Bossler, Edwardsburg, MI (US); Hari Bhushan Gupta, Schaumburg, IL (US); Kenneth R. Workman, Hoffman Estates, IL (US); Jospeh C. Jimerson, Conroe, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1029 days.

(21) Appl. No.: 11/303,160

(22) Filed: Dec. 15, 2005

(65) Prior Publication Data
US 2007/0138093 A1 Jun. 21, 2007

(51) Int. Cl.
*B01D 61/00* (2006.01)
(52) U.S. Cl. ..... 210/639; 210/201; 210/203; 210/195.2; 210/652; 210/259; 210/806
(58) Field of Classification Search ............ 210/639, 210/195.2, 806, 652, 259, 201, 203
See application file for complete search history.

(56) References Cited

U.S. PATENT DOCUMENTS

| | | | |
|---|---|---|---|
| 4,188,291 A * | 2/1980 | Anderson | 210/639 |
| 4,200,526 A | 4/1980 | Johnson et al. | |
| 4,261,833 A | 4/1981 | Pohl et al. | |
| 4,574,049 A | 3/1986 | Pittner | |
| 5,043,072 A | 8/1991 | Hitotsuyanagi et al. | |
| 5,069,798 A * | 12/1991 | Hwa et al. | 210/700 |
| 5,116,507 A | 5/1992 | Ebbins et al. | |
| 5,182,023 A | 1/1993 | O'Connor et al. | |
| 5,256,303 A | 10/1993 | Zeiher et al. | |
| 5,366,634 A * | 11/1994 | Vijayan et al. | 210/638 |
| 5,501,798 A | 3/1996 | Al-Samadi et al. | |
| 5,558,775 A | 9/1996 | Busch, Jr. | |
| 5,766,479 A | 6/1998 | Collentro et al. | |
| 5,925,255 A | 7/1999 | Mukhopadhyay | |
| 5,980,750 A | 11/1999 | Kelly | |
| 5,997,745 A | 12/1999 | Tonelli et al. | |
| 6,071,413 A | 6/2000 | Dyke | |
| 6,113,797 A | 9/2000 | Al-Samadi | |
| 6,120,689 A | 9/2000 | Tonelli et al. | |
| 6,126,834 A | 10/2000 | Tonelli et al. | |
| 6,187,195 B1 | 2/2001 | Zarges et al. | |

(Continued)

FOREIGN PATENT DOCUMENTS

EP 1018489 7/2000

(Continued)

OTHER PUBLICATIONS

Gabelich, Christopher J., "Control of Residual Aluminum from Conventional Treatment to Improve Reverse Osmosis Performance", *2002 AWWA Water Quality Technology Conference*, American Water Works Association, pp. 1-11, (2002).

(Continued)

*Primary Examiner* — Nam Nguyen
*Assistant Examiner* — Denise R Anderson (57) ABSTRACT

The invention relates to systems and methods of treating water by directing the water to a first reverse osmosis (RO) membrane; separating the water using the first RO membrane; adding a chelating agent to first permeate and/or raising the pH of the first permeate to between about 5.5 and 7.5 before a second RO membrane; and separating the first permeate into a second permeate and a second concentrate using the second RO membrane, thereby separating constituents from the water.

20 Claims, 8 Drawing Sheets

U.S. PATENT DOCUMENTS

| | | |
|---|---|---|
| 6,303,037 B1 | 10/2001 | Tamura et al. |
| 6,338,803 B1 | 1/2002 | Campbell et al. |
| 6,391,206 B2 | 5/2002 | Chihara et al. |
| 6,398,965 B1 | 6/2002 | Arba et al. |
| 6,416,668 B1 | 7/2002 | Al-Samadi |
| 6,423,236 B1 | 7/2002 | Shiota et al. |
| 6,645,316 B1 * | 11/2003 | Brouwer et al. ............ 148/253 |
| 6,758,976 B2 | 7/2004 | Michalski et al. |
| 6,758,977 B2 | 7/2004 | Michalski et al. |
| 2003/0080067 A1 | 5/2003 | Michalski et al. |
| 2004/0050793 A1 * | 3/2004 | Ando et al. ............... 210/652 |
| 2004/0108277 A1 | 6/2004 | Krulik |
| 2004/0129642 A1 | 7/2004 | Binot |
| 2004/0188348 A1 | 9/2004 | Yamasaki et al. |
| 2005/0051488 A1 | 3/2005 | Nagghappan et al. |
| 2005/0103719 A1 | 5/2005 | Binot et al. |

FOREIGN PATENT DOCUMENTS

| | | |
|---|---|---|
| JP | 58017887 | 2/1983 |
| JP | 62294484 | 12/1987 |
| JP | 9001141 | 1/1997 |
| JP | 2000167359 | 6/2000 |
| JP | 2001029752 | 2/2001 |
| JP | 2001047045 * | 2/2001 |
| JP | 2002253931 | 9/2002 |
| WO | WO 82/02379 | 7/1982 |
| WO | WO 97/05945 | 2/1997 |
| WO | WO 98/39085 | 12/1998 |
| WO | WO 02/26362 | 4/2002 |
| WO | WO 02/26640 | 4/2002 |
| WO | WO 02/068338 | 9/2002 |
| WO | WO 02/101115 | 12/2002 |
| WO | WO 03/008336 | 1/2003 |
| WO | WO 03/035557 | 5/2003 |
| WO | WO 2005/009908 | 2/2005 |

OTHER PUBLICATIONS

Hansen, Jeff, "Use of Reverse Osmosis in the Treatment and Reuse of Metal Finishing Process Water by the Boeing Company", *2002 Water Sources Conference Proceedings*, American Water Works Association, pp. 1-21, (2002).

Mickley, Michael C. et al., "Experimental Studies of Silica Scaling in Laboratory Reverse Osmosis Systems", *Technical Proceedings—WSIA 10th Annual Conference and Trade Fair. Honolulu, HI, Jul. 25-29, 1982*, 22 pages, (1982).

Perpich, Jr., Bill et al., "Mobile Wastewater Treatment Helps Remediate Concentrated Acidic Process Water at Fertilizer Plant", *Florida Water Resources Journal*, pp. 24-36, (2005).

Savoia Brown et al., "Technical Brief—Aluminum Fouling of Milli-RO® Hi-Flux CP Modules", Millipore Corporation, Lit. No. TB035, 4 pages, (1988).

Smith, Terry, "Comparison of Pretreatment Chemicals for Reclamation of Phosphate Process Water by Reverse Osmosis", Calpine Corporation, *US Filter*, 66 pages, (2002).

Zubarev, S.V., "Purification of Waste Water in Petroleum Refining Industries by Membrane Methods", *Chemistry and Technology of Fuels and Oils*, vol. 25, Nos. 11-12, pp. 588-592, (1990).

* cited by examiner

| parameter | unit | Feedwater | Pre-Treated Feedwater | 1st Pass Permeate | 2nd Pass Permeate | DI Product - Weak Base Anion |
|---|---|---|---|---|---|---|
| conductivity @ 25°C | micromhos | 15700 | 15700 | 1064 | 61 | 1.01 |
| turbidity | NTU | 19.3 | 1 | 0.01 | 0.13 | 0.01 |
| TOC | ppm as C | 107 | 107 | 10.89 | 0.724 | 3.06 |
| pH | Std. Units (0-14) | 1.7 | 1.7 | 2.55 | 6.20 | 7.33 |
| TOTAL hardness | ppm as CaCO3 | 4420 | 4420 | 94.33 | 0.22 | 0.22 |
| calcium | ppm as Ca | 1410 | 1410 | 36.07 | 0.06 | 0.08 |
| magnesium | ppm as Mg | 219 | 219 | 1.05 | 0.01 | 0.004 |
| sodium | ppm as Na | 2411 | 2411 | 40.6 | 9.29 | 0.03 |
| potassium | ppm as K | 357 | 357 | 7.51 | 0.76 | 0.297 |
| Mineral Acidity | ppm as CaCO3 | 16400 | 16400 | 480 | | |
| Total Acidity | ppm as CaCO3 | 31000 | 31000 | 831 | | 1 |
| aluminum | ppm as Al | 100 | 100 | 0.69 | 0.007 | 0.006 |
| barium | ppm as Ba | 0.256 | 0.256 | 0.001 | 0.050 | 0.006 |
| iron | ppm as Fe | 130 | 130 | 0.68 | 0.003 | 0.002 |
| manganese | ppm as Mn | 14.3 | 14.3 | 0.074 | | 0.001 |
| copper | ppm as Cu | 0.316 | 0.316 | 0.005 | 0.003 | 0.003 |
| strontium | ppm as Sr | 33 | 33 | 0.198 | 0.002 | 0.002 |
| zinc | ppm as Zn | 4.29 | 4.29 | 0.046 | 0.003 | 0.003 |
| Ammonia | ppm as NH4 | 456 | 456 | 16.9 | 2.72 | 0.867 |
| bicarbonate | ppm as HCO3 | 0.6 | 0.6 | 0.61 | 0.61 | 0.61 |
| chloride | ppm as Cl | 240 | 240 | 27.09 | 1.11 | 0.004 |
| fluoride | ppm as F | 5647 | 5647 | 238.24 | 9.20 | 0.009 |
| nitrate | ppm as NO3 | 1.2 | 1.2 | 7.14 | 1.64 | 0.005 |
| phosphate | ppm as PO4 | 19934 | 19934 | 305.9 | 0.52 | 0.005 |
| phosphorus | ppm as P | 6645 | 6645 | 102.0 | | 0.002 |
| sulfate | ppm as SO4 | 4687 | 4687 | 42.36 | 0.15 | 0.012 |
| total silica | ppm as SiO2 | 2471 | 2471 | 35.21 | 0.40 | 0.006 |

FIG. 7

| parameter | unit | 1st Pass Permeate | 2nd Pass Permeate - No caustic feed | 2nd Pass Permeate - 6 pH | 2nd Pass Permeate - 7 pH | 2nd Pass Permeate - 7.5 pH |
|---|---|---|---|---|---|---|
| conductivity @ 25°C | micromhos | 1064 | 651 | 202 | 284 | 184 |
| turbidity | NTU | 0.01 | .01 | 0.01 | 0.19 | 0.13 |
| TOC | ppm as C | 10.89 | 8.029 | 5.18 | 5.46 | 5.02 |
| pH | Std. Units (0-14) | 2.55 | 2.71 | 7.01 | 7.16 | 9.04 |
| TOTAL hardness | ppm as CaCO3 | 94.33 | 3.71 | 2.05 | 0.36 | 0.21 |
| calcium | ppm as Ca | 36.07 | 1.38 | 0.8 | 0.12 | 0.07 |
| magnesium | ppm as Mg | 1.05 | .06 | 0.01 | 0.02 | 0.01 |
| sodium | ppm as Na | 40.6 | 9.84 | 44.97 | 64.37 | 42.67 |
| potassium | ppm as K | 7.51 | 2.66 | 0.94 | 1.64 | 1.02 |
| Mineral Acidity | ppm as CaCO3 | 480 | 352 | | | |
| Total Acidity | ppm as CaCO3 | 831 | 440 | | 3 | |
| aluminum | ppm as Al | 0.69 | .081 | 0.013 | 0.012 | 0.006 |
| barium | ppm as Ba | 0.001 | .006 | 0.001 | 0.006 | 0.006 |
| iron | ppm as Fe | 0.68 | .053 | 0.002 | 0.002 | 0.002 |
| manganese | ppm as Mn | 0.074 | .004 | 0.001 | 0.001 | 0.001 |
| copper | ppm as Cu | 0.005 | .003 | 0.003 | 0.003 | 0.003 |
| strontium | ppm as Sr | 0.198 | .010 | 0.003 | 0.002 | 0.002 |
| zinc | ppm as Zn | 0.046 | .212 | 0.003 | 0.003 | 0.003 |
| Ammonia | ppm as NH4 | 16.9 | 0.6 | 2.36 | 4.67 | 4.2 |
| bicarbonate | ppm as HCO3 | 0.61 | 0.61 | 9.76 | 27.09 | 17.57 |
| chloride | ppm as Cl | 27.09 | 9.22 | 2.94 | 5.64 | 4.57 |
| fluoride | ppm as F | 238.24 | 114.75 | 35.68 | 39.90 | 23.71 |
| nitrate | ppm as NO3 | 7.14 | 4.72 | 2.91 | 3.16 | 2.21 |
| phosphate | ppm as PO4 | 305.9 | 26.98 | 5.76 | 12.03 | 7.79 |
| phosphorus | ppm as P | 102.0 | 9.0 | 1.9 | 4.0 | 2.6 |
| sulfate | ppm as SO4 | 42.36 | 4.88 | 0.82 | 1.77 | 1.48 |
| total silica | ppm as SiO2 | 35.21 | 4.24 | 6.36 | 11.14 | 11.94 |

FIG. 8 ium phosphate) TREATING ACIDIC WATER

TECHNICAL FIELD

The present invention relates to treatment of acidic water and, more particularly, to treatment of acidic water using reverse osmosis systems.

BACKGROUND

Process water associated with and produced by phosphate manufacturing operations is typically acidic and typically contains various dissolved constituents such as fluoride, ammonia, silica, sulfate, calcium, heavy metals, phosphate, magnesium, colloidal matter, organic carbon, and, in some instances, radium (a radioactive element). Ponds associated with past phosphate processing contain billions of gallons of this waste water. There is an urgent environmental need to treat this wastewater, particularly in environmentally sensitive areas, or areas where population growth has come into closer contact with phosphate processing sites. Treatment of this waste to reduce its toxicity and its volume has been a technological challenge of significant interest. The toxic or harmful contaminants must be either reduced or eliminated before treated water can be discharged into the environment.

Various techniques have been used to reduce the level of such constituents before water is discharged. For example, double liming, followed by air stripping, can be used. This process adds lime in two stages, to promote precipitation of fluoride species and phosphate species, followed by high pH air stripping to remove ammonia. In another technique, water is treated by techniques involving chemical precipitation followed by reverse osmosis. Like double liming, such techniques raise the pH of influent water to promote precipitation and solids separation before reverse osmosis.

Reverse osmosis involves separating water from a solution of dissolved solids by forcing water through a semi-permeable membrane. As pressure is applied to the solution, water and other molecules with low molecular weight and low ionic charge pass through small pores in the membrane. Larger molecules and those with higher ionic charge are rejected by the membrane.

Some constituents that can be found in water, such as fluoride and phosphate, tend to form soluble acids under acidic conditions thus reducing the potential for scaling of reverse osmosis membranes. Other constituents that can be found in water, such as ammonia, tend, under acidic conditions, to form salts that are easily rejected by the membranes. In dual-pass reverse osmosis systems, the pH of permeate from the first pass reverse osmosis membranes can be adjusted upwards towards neutral conditions between the first and second pass membranes to make it easier to remove constituents that tend to exist in soluble form under highly acidic conditions.

Antiscalants can be added before first pass and/or second pass reverse osmosis membranes. Typically, antiscalants are materials that interfere with precipitation reactions by mechanisms such as crystal modification in which negative groups located on the antiscalant molecule attack the positive charges on scale nuclei interrupting the electronic balance necessary to propagate the crystal growth. Similarly, some antiscalants adsorb on crystals or colloidal particles and impart a high anionic charge, which tends to keep the crystals separated.

Some treatment systems include pretreatment before the reverse osmosis membranes to remove constituents such as suspended solids that can clog the reverse osmosis membranes. Some treatment systems include polishing technologies to reduce the residual concentrations of constituents for which allowable discharge concentrations are very low. Although these polishing technologies may be necessary to meet discharge criteria, they can add significantly to the overall treatment system operating costs.

SUMMARY

The invention is based, at least in part, on the discovery that one can effectively and efficiently treat water (e.g., water associated with the production of ammonium phosphate) having a low pH to remove contaminants by using multiple reverse osmosis membranes arranged in series and by controlling the pH between the reverse osmosis membranes. For example, in a dual-pass reverse osmosis system, a first pass reverse osmosis membrane operating under highly acidic conditions can be used to separate influent water into a first permeate and a first concentrate. The first permeate can then be separated into a second concentrate and a second permeate using a second pass reverse osmosis membrane. The pH of the first permeate can be raised to between about 5.5 and 7.5, e.g., from about 5.5 to 6.0, before it contacts the second pass reverse osmosis membranes. The optimum pH for treatment of water with multiple constituents can be outside the optimal ranges for rejection of individual species.

The new methods also reduce the need to use polishing systems through the use of chelating agents (also called complexing or sequestering agents) in place of antiscalants and/or the careful control of interpass pH. In contrast to antiscalants, chelating agents are compounds that form stable complexes with metal ions. Thus, precipitation of sparingly soluble salts, e.g., of calcium and magnesium with inorganic anions, fatty acids, and anionic surfactants can be reduced.

In one aspect, the invention features methods of removing constituents from water having a pH below about 4.5 (e.g., below 3.5) by: directing the water to a first pass reverse osmosis membrane; separating the water into a first permeate and a first concentrate using the first pass reverse osmosis membrane; adding a chelating agent (e.g., ethylenediaminetetraacetic acid) to the first permeate before the second pass reverse osmosis membrane; and separating the first permeate into a second permeate and a second concentrate using a second pass reverse osmosis membrane, thereby separating constituents from the water.

In another aspect, the invention features methods of treating acidic water (e.g., water with a pH of below about 4.5, e.g., having constituents including at least ammonia, fluoride, and phosphate species) by: directing acidic water to a first pass reverse osmosis membrane; separating the water into a first permeate and a first concentrate with the first pass reverse osmosis membrane; adjusting the pH of the first permeate to between about 5.5 and 6.0 by adding an alkali to the water; and separating the first permeate into a second permeate and a second concentrate with a second pass reverse osmosis membrane. Some embodiments of this aspect also include adding a chelating agent to the first permeate.

In another aspect, the invention features methods of removing constituents from water having a pH below about 4.5 by: directing the water to a first pass reverse osmosis membrane; separating the water into a first permeate and a first concentrate using the first pass reverse osmosis membrane; adding a chelating agent to the first permeate before the second pass reverse osmosis membrane; separating the first permeate into a second permeate and a second concentrate using a second pass reverse osmosis membrane, thereby separating constituents from the water; and increasing an amount of chelating agent being added to the first permeate in response an accumulation of solid material on the second pass membrane.

In some embodiments of these methods, the constituents can include at least ammonia, fluoride, and phosphate species. The constituents can also include at least one of calcium, magnesium, and silica, e.g., at concentrations in the water above 100 parts per million. At least one of fluoride, calcium, magnesium, and silica can be present in the first permeate at conditions that can cause scaling on a reverse osmosis membrane at a pH between about 5.5 and 8.0 and/or can be present at concentrations in the first permeate above about 10 parts per million.

In some embodiments, the new methods also include raising a pH of the first permeate to between about 5.5 and 7.5 (e.g., between about 6.5 and 7.5 or between about 5.5 and 6.0). For example, the pH of the first permeate can be raised by adding an alkali (e.g., sodium hydroxide) to the first permeate.

In some embodiments, separating the first permeate includes concentrating one or more of ammonia, fluoride, and phosphate species in the second concentrate. In other embodiments, the methods can also include adding at least a portion of the second concentrate to the water directed to the first pass reverse osmosis membrane. In various embodiments, methods can also include pre-treating the water prior to directing the water to the first pass reverse osmosis membrane. The water can be pre-treated by reducing the concentration of suspended solids in the water (e.g., by passing the water through one or more media filters). The concentration of suspended solids can also be reduced by adding a coagulant to the water before passing the water through the filters.

In certain embodiments, the methods can also include passing the second permeate through an ion exchange system. The methods can also include adding an antiscalant (e.g., a sodium salt of phosphonomethylated diamine) to the water before the first pass reverse osmosis membrane, or can include lowering the pH of the water by adding an acid to the water before the first pass reverse osmosis membrane. The new methods can also include passing the second permeate through an ion exchange system. In various embodiments, the methods can also include raising the pH of the first permeate to form conditions in the first permeate that favor formation of salts over other ammonia, fluoride, and phosphate species. In some instances, the pH is raised (e.g., to between about 5.5 and 6.0 or to between about 6.5 and 7.2) by adding an alkali to the first permeate.

In another aspect, the invention includes systems for treating acidic water that include a first pass reverse osmosis unit that separates incoming water into a first permeate and a first concentrate; a second pass reverse osmosis unit arranged to receive at least a portion of the first permeate from the first pass reverse osmosis unit; and an interpass chemical controller located upstream of the second pass reverse osmosis unit, wherein the controller is configured to raise the pH of at least the portion of the first permeate to between about 5.5 and 7.5 and adds a chelating agent to at least the portion of the first permeate.

In some embodiments, the new systems can include thin film composite polyamide reverse osmosis membranes, which have been found to have a particularly beneficial combination of membrane flux, fouling resistance, and chemical resistance characteristics well-suited for the conditions of operation on phosphate wastewater streams.

In some embodiments, the new systems can also include one or more of the following components: one or more storage units for holding acidic water; a fluid routing system arranged to direct at least a portion of a second concentrate from the second pass reverse osmosis unit to a location upstream of the first pass reverse osmosis unit; a pretreatment unit (e.g., pretreatment unit including a first stage media filter and a second stage media filter) disposed upstream of the first pass reverse osmosis unit; an ion exchange unit receiving at least a portion of a second permeate from the second pass reverse osmosis unit.

The interpass chemical controller can include a chemical injector that adds the chelating agent to the first permeate and/or a chemical injector that adds an alkali to the first permeate.

The invention provides several advantages. Careful control of interpass pH and/or the use of chelating agents in place of antiscalants can reduce the need for polishing systems such as ion exchangers. This can reduce operating costs, eliminate the need for storage of hazardous regenerants, reduce the salt discharge from the ion exchange regenerant waste stream, and increase the overall system recovery. The combined use of pH control and the metering of low levels of chelating agents on a continuous or semi-continuous basis, particularly on dual pass reverse osmosis systems where the chelating agent is added to the first pass permeate before being fed to the second pass, can also result in a reduction of cleaning frequency, longer life for the reverse osmosis membranes, and operation at higher water recovery rates over longer time periods. Moreover, if radium is present in the water being treated, reducing scaling can reduce the precipitation and concentration of radium on the membranes and limit the issues associated with handling the resultant radioactive material.

The new methods can also reduce system downtime for cleaning of membranes due to scaling, plugging, or fouling of the membranes caused by precipitation or colloid agglomeration or deposition or binding of foulants on the membrane surfaces. Continuous feeding of chelating agents can, to some extent, prevent such problems. However, it has also been discovered that, when such problems occur, the problems can be addressed by increasing the chelating agents in the membrane feed water while continuing to operate the system. Cleaning the membranes in place while the system is operating reduces costs including, for example, costs associated with loss of production due to system downtime and/or costs associated with maintaining onsite membrane cleaning facilities and/or backup membranes.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

The new dual-pass reverse osmosis systems and methods described herein can be used for treating acidic water that contains ammonia, fluoride, and/or phosphate species, such as the process water produced during the production of phosphate-based fertilizers. In some embodiments, the systems can include pretreatment before the first pass reverse osmosis membranes to remove suspended solids from the influent water. The pH of permeate from the first pass reverse osmosis membranes is adjusted upwards to increase the rejection of fluoride and phosphate species in the second pass reverse osmosis membranes. Chelating agents can be added to the permeate from the first pass reverse osmosis membranes.

General Methodology

Figure 1:
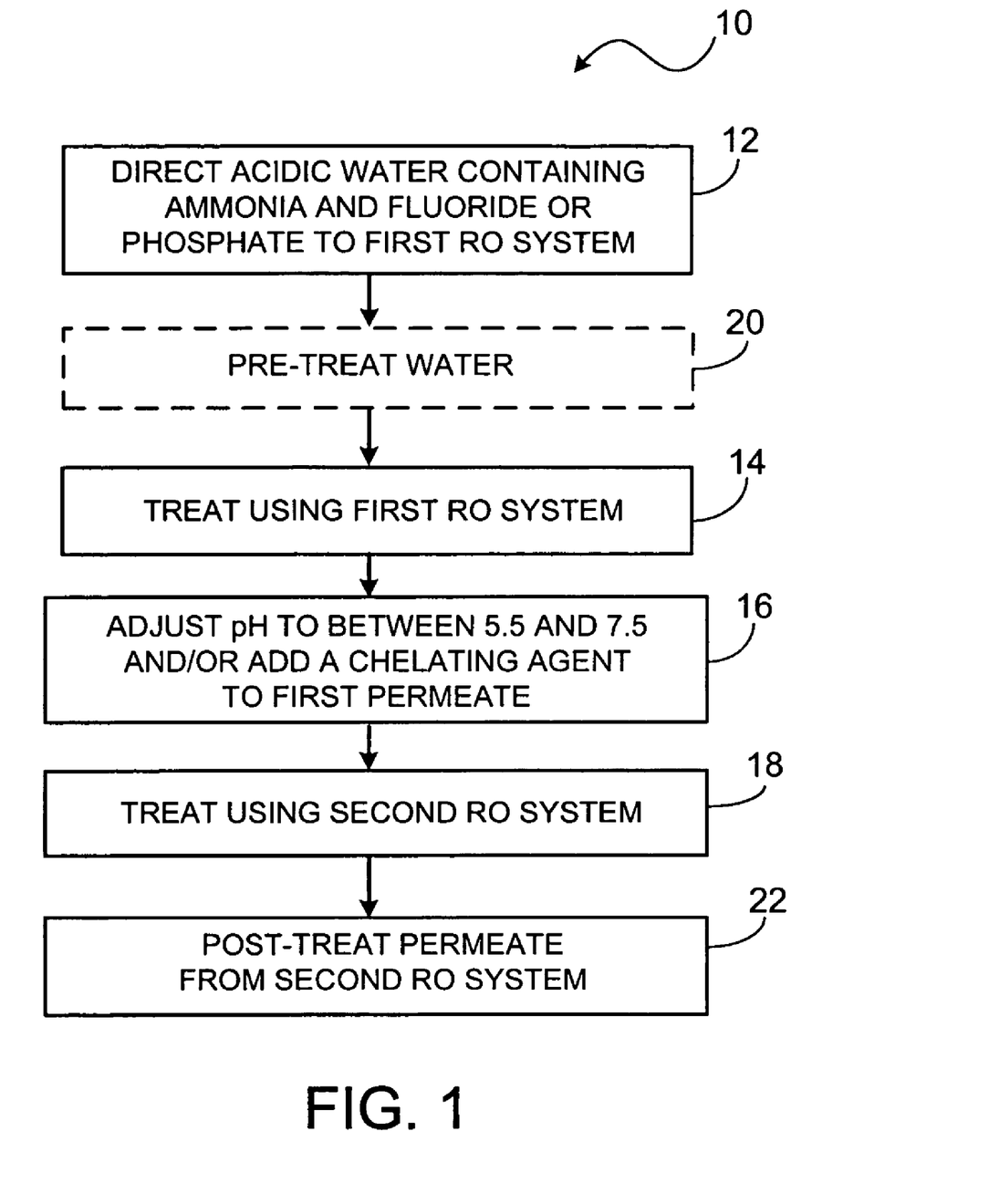
FIG. 1 is a flow diagram of a method for treating acidic water.
Figure 2:
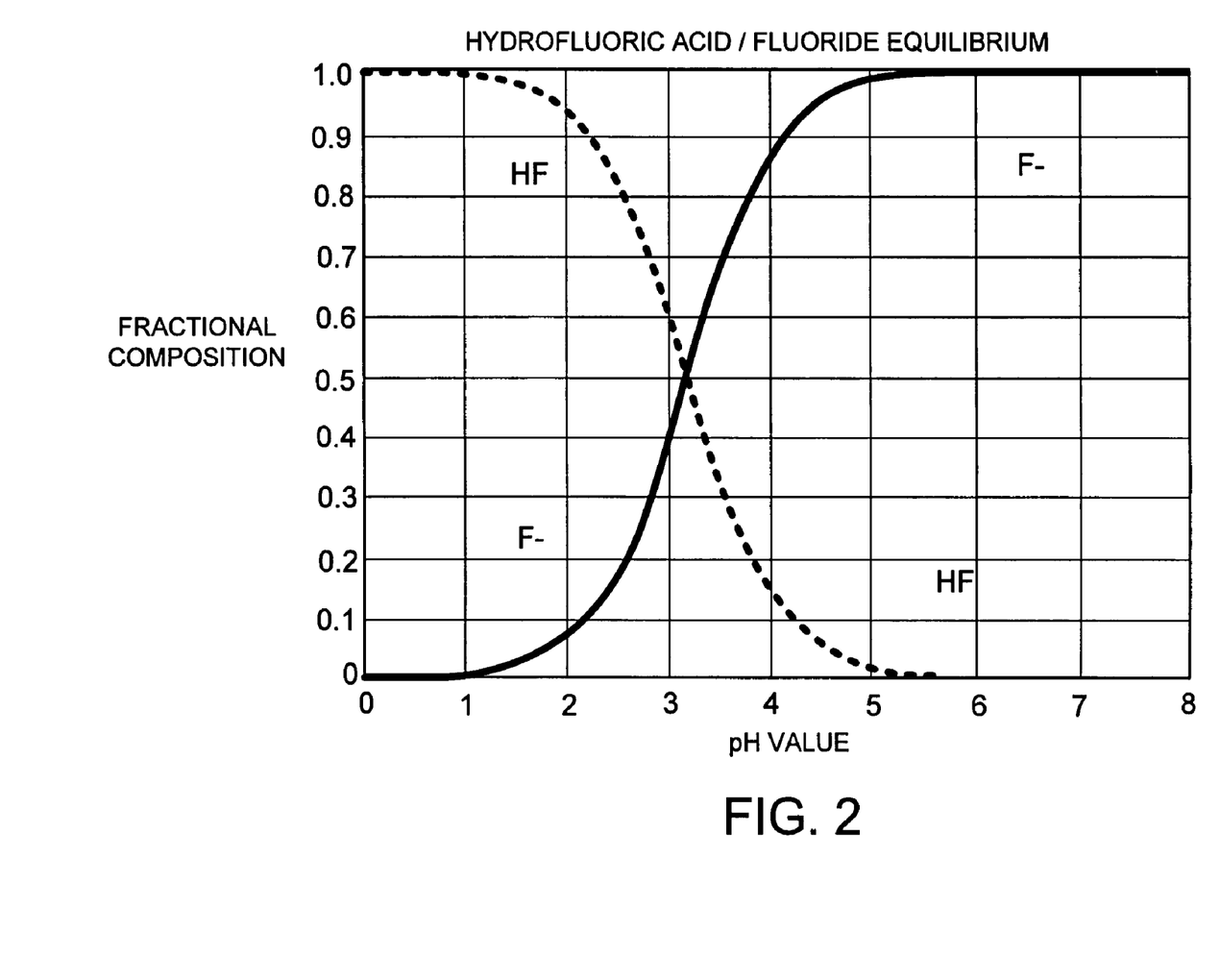
FIG. 2 is a graph showing the equilibrium relative composition of hydrofluoric acid and fluoride species as a function of pH.
Figure 3:
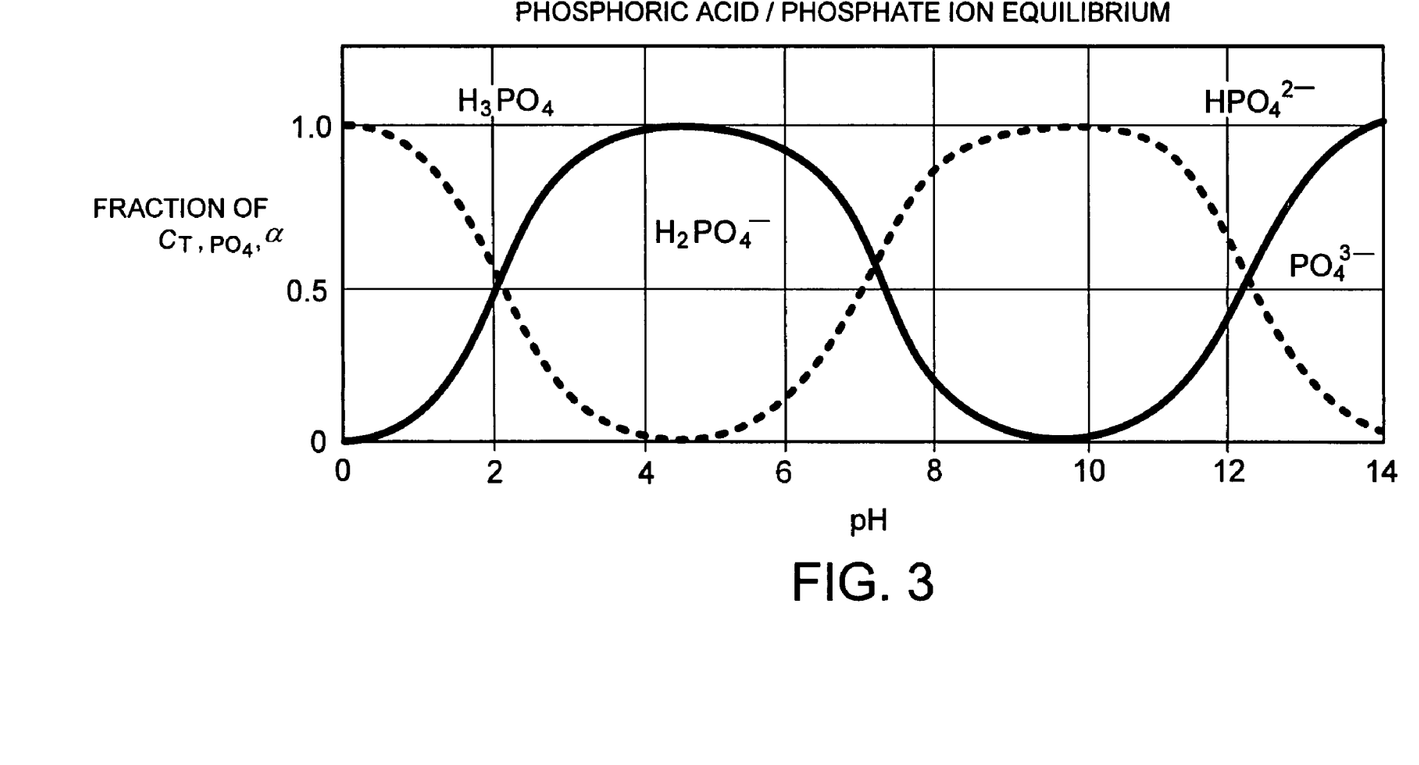
FIG. 3 is a graph showing the equilibrium relative composition of phosphoric acid and phosphate species as a function of pH.
Figure 4:
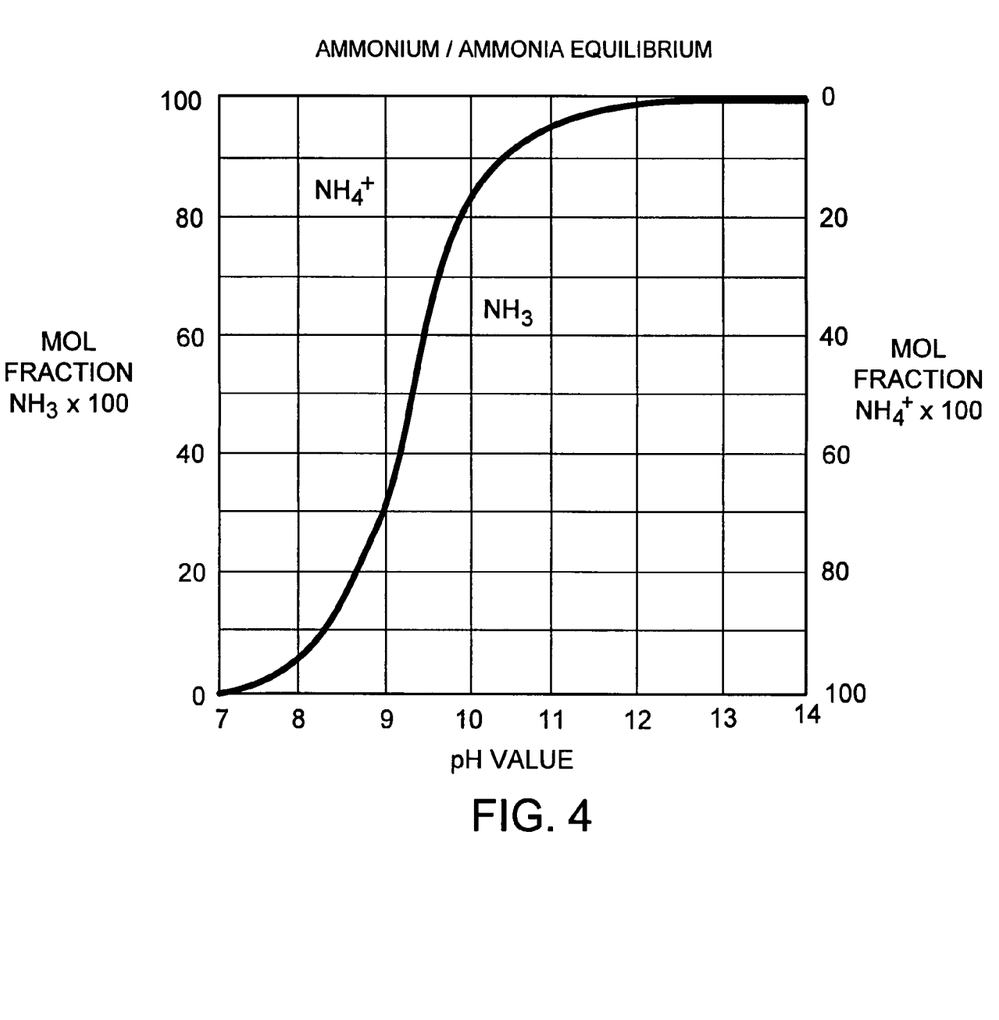
FIG. 4 is a graph showing the equilibrium relative composition of ammonium and ammonia species as a function of pH.

FIG. 1 illustrates a method 10 for treating acidic water containing constituents including at least species of ammonia, fluoride, and phosphate, which is based on the use of two reverse osmosis systems provided in series. Water having a pH below about 4.5 and containing at least ammonia, fluoride, and phosphate species is directed to a first pass reverse osmosis membrane (step 12). The first pass reverse osmosis membrane is used to separate the influent stream into a first permeate and a first concentrate (step 14). Operating under highly acidic conditions (e.g., pH less than about 4.0, 3.8, 3.6, 3.5, 3.4, 3.2, or less than about 3.0) reduces the potential for scaling of the reverse osmosis membrane as the fluoride and phosphate are typically present in the form of soluble acids (e.g., hydrofluorosilic acid and phosphoric acid) that pass through the reverse osmosis membrane (see FIGS. 2 and 3). Operating under these conditions also provides for good rejection of ammonia in the form of ammonium salts, which are typically the predominant ammonia species in solutions whose pH is below 4 (see FIG. 4).

In dual-pass reverse osmosis systems, the pH of the first permeate is sometimes raised to close to neutral or higher before the second pass reverse osmosis membrane, because in this range (e.g., above about 6.5) the rejection of fluoride and phosphate improves as they tend to form salts. However as pH increases, ammonia is increasingly present in the form of free ammonia, which passes through reverse osmosis membranes more easily than the ammonium salts. Consequently, residual ammonia in the first permeate tends to pass through second pass reverse osmosis filters in systems where the pH of the first permeate is raised before the second pass reverse osmosis membrane. As the optimal pH for ammonia removal using reverse osmosis is below 4 and the optimal pH for fluoride and phosphate removal using reverse osmosis is above 6.0, the residual ammonia is often dealt with using polishing technologies (e.g., ion exchange beds) after the second pass reverse osmosis membrane. Control of interpass pH to between about 5.5 to 6.0 can reduce the need for such polishing in certain systems.

In the present new methods, the pH of the first permeate can be raised to between about 5.0 and 7.5 (e.g., a minimum pH of 5.1, 5.2, 5.3, 5.4, 5.5, 5.6, or 5.7; and a maximum pH of 7.5, 7.4, 7.3, 7.2, 7.1, 7.0, 6.9, 6.8, 6.7, 6.6, 6.5, 6.4, 6.3, 6.2, 6.1, 6.0, 5.9, or 5.8) (step 16), e.g., within a range of 5.5 to 6.0, before the pH-adjusted first permeate is separated into a second permeate and a second concentrate using a second pass reverse osmosis membrane (step 18). The use of this specific pH range has been found to concentrate ammonia, fluoride, and phosphate in the second concentrate to significantly reduce the need to apply polishing technologies to the second permeate to meet water discharge criteria.

In the present new method, one or more chelating agents can be added to the first permeate (step 16) to form stable complexes with metal ions. Chelating agents are generally known and include, for example, ethylenediaminetetraacetic acid (EDTA), nitrilotriacetic acid (NTA), diethylenetriaminepentaacetic acid (DTPA), and (hydroxyethyl) ethylenediaminetriacetic acid (HEDTA) (see, e.g., "Selecting The Correct DOW Chelating Agent," The Dow Chemical Company, Midland, Mich., the entire contents of which are incorporated herein by reference). The chelating agent(s) can be added as an aqueous solution to produce a concentration of the chelating agent in the treatment stream in the range between about 5 to about 50 parts per million (ppm). The chelating agent(s) can form complexes with calcium to prevent the precipitation of calcium fluoride on the reverse osmosis membrane surface. The formation of such precipitation can inhibit the passage of water through the reverse osmosis membranes, thus requiring higher pressures to maintain constant flow. In addition, if precipitation occurs, the precipitant can be removed by the addition of higher levels of the chelating agent.

Chelating agents, being more ionized at higher pHs, tend to have higher affinity for constituents including calcium and radium as pH increases. However, the use of chelating agents at pH levels below pH 7 (in the acid range) has been unexpectedly effective in eliminating chemical precipitation and membrane fouling even with the chelating agents at low ppm concentrations in the water being treated. Moreover, the continuous feed of chelating agent under these conditions can restore membrane performance that has been degraded by prior precipitation and fouling without taking the treatment system offline.

In some embodiments, the first pass reverse osmosis membranes can create a leveling effect on the impurities in the first permeate. This can be important for treatment of feeds that vary in their levels of constituents to be removed over time, since the amount of chelating agent that is used interpass can be relatively constant in spite of the variations in constituent concentrations in the feedwater. For example, the first pass reverse osmosis membranes tend to remove a percentage of the constituents present in the feed water. Thus, if the first pass reverse osmosis membranes reject 99% of a specific constituent, e.g., calcium, a change in calcium feed concentrations from 100 ppm to 200 ppm in the feedwater would result in a first pass permeate concentration change from 1 ppm to 2 ppm. Accordingly, an interpass chemical feed system that adds a chelating agent would need to add only the chemical equivalent 2 ppm of the chelating agent while use of this technique with a first pass feedwater would require the addition of the chemical equivalent 200 ppm of the chelating agent.

In some embodiments, method 10 can include pretreating the water (step 20) before it is directed to a first pass reverse osmosis membrane (step 12). Pretreatment can include, for example, removing organic matter by adding a disinfectant, a coagulant, and/or a flocculating agent to the water and/or reducing the level of suspended solids in the water by adding a coagulant and passing the water through media filters. Such pretreatment can be particularly advantageous in treating water that is exposed to the environment such as process/product water associated with phosphate manufacturing operations, which is typically accumulated in open on-site ponds. Similarly, an antiscalant and/or other chemical amendment such as, for example, a chelating agent, can be added to the water before the first pass reverse osmosis membrane and/or the second pass reverse osmosis membrane.

In some embodiments, method 10 can include polishing the second permeate (step 22) after it leaves the second pass reverse osmosis membrane to additionally reduce the levels of constituents such as species of ammonia, fluoride, and/or phosphate. Polishing can include, for example, passing the second permeate through an ion exchange system to further reduce ammonia concentrations prior to discharge. Although polishing may be necessary to meet regulatory standards prior to discharge of treated water, such polishing typically increases the operational costs of associated with implementing method 10. However, adjusting the pH of the first permeate (step 16) as described herein can reduce or eliminate the need for polishing the second permeate.

In some embodiments, separating the first permeate can include concentrating ammonia, fluoride, and phosphate species in the second concentrate (i.e., these constituents are present in higher concentrations in the second concentrate than in the second permeate). However, the second concentrate contains these constituents at lower concentrations than they are present in the source water directed to the first pass reverse osmosis system. Consequently, method 10 can also include adding at least a portion of the second concentrate to the water directed to the first pass reverse osmosis membrane. In some instances, at least a portion of the first concentrate is directed back to a storage system from which the water is directed to the first pass reverse osmosis membrane.

Method 10 can also include lowering a pH of the water by adding an acid to the water between the storage system and the first pass reverse osmosis membrane. This step is typically not included when method 10 is used to treat acidic water whose pH is naturally below 4.5 (e.g., less than about 3.8, 3.6, 3.5, 3.4, 3.2, or less than about 3.0) such as process/product water accumulated in on-site ponds at phosphate manufacturing operations. It can be necessary when treating water from other sources or to maintain influent at the desired pH when other processes such a double liming are also being used to treat phosphate and manufacturing process/product water.

Systems to Treat Acidic Water

Figure 5:
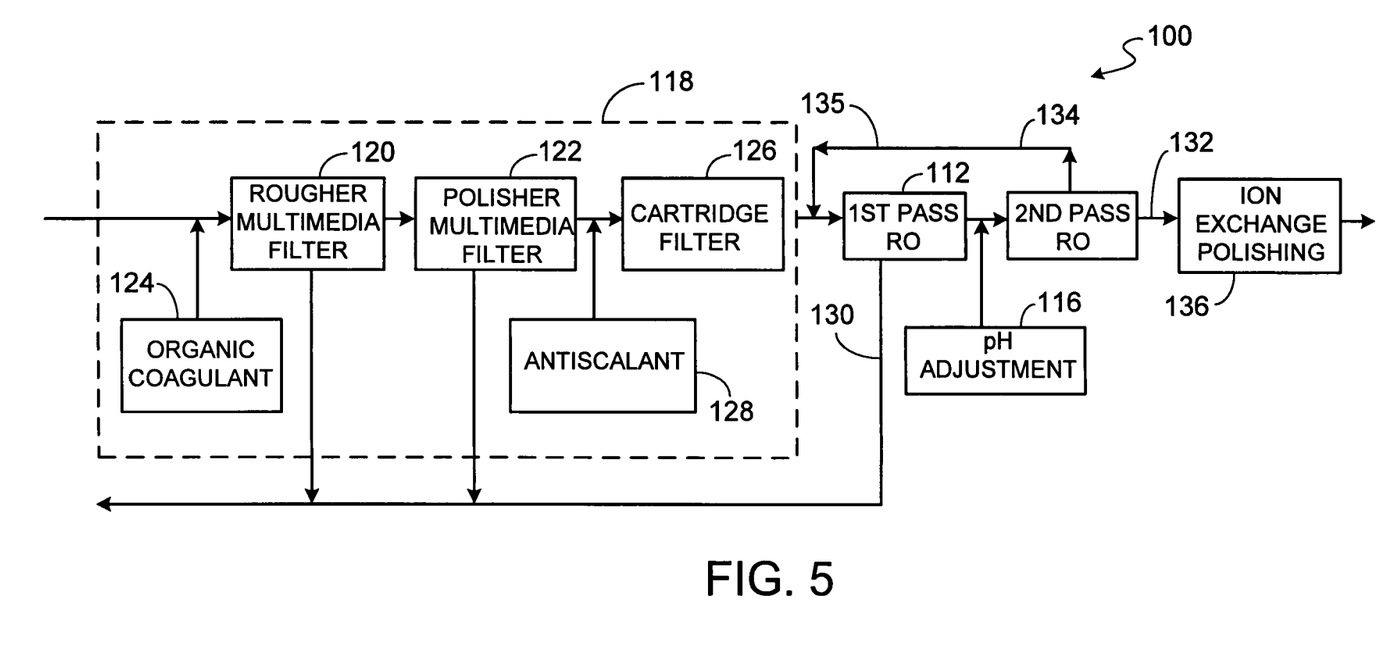
FIG. 5 is a schematic of a system for implementing the method of FIG. 1.

FIG. 5 illustrates a system 100 that can be used to treat acidic water whose constituents include at least ammonia, fluoride, and phosphate species, for example, process/product water associated with phosphate manufacturing operations. The system 100 receives influent water from, for example, on-site ponds at a phosphate manufacturing facility holding acidic water with a pH below about 4.5. A first pass reverse osmosis system 112 is disposed downstream of the storage units and a second pass reverse osmosis system 114 receives a first permeate 115 from the first pass reverse osmosis system. System 100 also includes an interpass pH adjustor system 116 for raising a pH of first permeate 115 to between about 5.0 and 6.0 or higher, e.g., up to 6.5, 7.0, or 7.5 in certain embodiments.

Interpass pH adjustor system 116 includes a chemical injector 117 that can add an alkali (e.g., sodium hydroxide, caustic potash or potassium hydroxide) to the first permeate 115 before it reaches second pass reverse osmosis system 114. Interpass pH adjustor system 116 can also include sensors 119 that measure the pH of first permeate 115 and controllers 121 that regulate the injection of the alkali based on readings from the sensors. In some embodiments, interpass pH adjustor system 116 also includes a chemical injector 117 adding a chelating agent to first permeate 115 before it reaches second pass reverse osmosis system 114. In some embodiments, interpass pH adjustor system 116 also includes additional chemical injectors 117 adding other chemicals such as, for example, a chelating agent (e.g., EDTA, NTA, or DTPA) to first permeate 115 before it reaches second pass reverse osmosis system 114. The chelating agents can be injected directly into the feed stream of the second pass reverse osmosis membranes as an aqueous solution using a chemical injection pump. The caustic used to adjust the pH upward is also injected at approximately the same point also using a chemical feed pump. A pH probe downstream of the injection point and a static mixer sends a signal to the pH meter. This meter in turn sends a signal to the chemical feed pump that can automatically adjust the caustic dosage to maintain a constant, predetermined pH value.

In some embodiments, system 100 includes a pretreatment unit 118 disposed upstream of first pass reverse osmosis system 112. Water stored in storage ponds can contain constituents such as, for example, organics compounds, algae, and various suspended solids that may clog the pores of reverse osmosis membranes 112, 114. In some embodiments, pretreatment unit 118 includes first stage media filters 120 and second stage media filters 122. Such filters preferably reduce the turbidity of water to less than about 2 Nephelometric Turbidity Units (NTU) and reduce the Silt Density Index (SDI) to less than about 4 to reduce the likelihood of downstream fouling. A chemical injection system 124 can add an organic coagulant such as, for example, diallyl dimethyl ammonium chloride (DADMAC) commercially available from Nalco Chemical as Cat-Floc 8103 Plus, between the storage ponds and first stage media filters. Such organic coagulants, added for example in amounts calculated to result in coagulant concentrations between about 8 and about 10 ppm, can increase the agglomeration of suspended solids to increase their size and facilitate their removal in the filters.

Under operating conditions, a bank of cartridge filters 126 receives flow from the second stage media filters. Under cleaning conditions, backwash water from both first and second stage media filters is returned to storage ponds 110.

In other embodiments, pretreatment systems designed to remove algae from the feedwater can be used in place of or in addition to filters. Clarification systems including, for example, ballasted floc reaction technologies (described in more detail in U.S. Patent App No. 2005/0103719 incorporated herein by reference in its entirety), can be used to remove algae and other suspended solids before the first pass reverse osmosis membranes. Examples include the ACTI-FLO® Ballasted Clarification systems, commercially available from Kruger Inc. of Cary, N.C. Such clarifiers can use a disinfectant, such as sodium hypochlorite, to deactivate any microorganisms or organic matter in the wastewater stream; a coagulating agent, such as, but not limited to, bentonite, aluminum sulfate, and ferric chloride, to promote coagulation of deactivated matter; and a flocculating agent such as, but not limited to, nonionic, cationic, anionic polymers or combinations thereof, to promote flocculation of the deactivated, coagulated matter. Such clarifiers can also use microsand enhanced settling and hydrocyclone techniques to separate sludge or solids from the liquid-rich stream.

Another chemical injection system 128 can be used to add an antiscalant such as, for example, such as the sodium salt of phosphonomethylated diamine, commercially available from Nalco Chemical as EL-5300, before the water reaches first pass reverse osmosis system 112. Although any suitable antiscalant that inhibits the formation of scale on the reverse osmosis membranes can be used, most antiscalants used for reverse osmosis applications do not function well under highly acidic conditions. In certain embodiments, the antiscalant is added between the second stage media filters 122 and cartridge filters 126. The antiscalant reduces the tendency of some chemical species to precipitate out of solution onto the reverse osmosis membrane and clog pores of reverse osmosis membranes 112.

First pass reverse osmosis system 112 separates influent water into first permeate 115 and first concentrate 130. As discussed above, first permeate 115 is the influent to second pass reverse osmosis system 114. In certain embodiments, first concentrate 130, containing increased concentrations of ammonia, fluoride, and phosphate species, is returned to storage ponds 110. In other embodiments, at least a portion of first concentrate 130 can be mixed with water being treated between storage units and first pass reverse osmosis membranes 112. Similarly, second pass reverse osmosis system 114 separates first permeate 115 into second permeate 132 and second concentrate 134. In some embodiments, piping 135 returns second concentrate 134 to the inlet side of first pass reverse osmosis system 112, because the second concentrate typically has lower levels of ammonia, fluoride, and phosphate species than water from storage ponds 110. Thus, the second concentrate dilutes the source water.

First pass reverse osmosis system 112 should be suitable for treatment of water having a pH of less than about 4, and flux rates of about 6 to about 12 gallons per square foot of membrane per day (GFD) because, it is believed, high flux rate greater than about 12 GFD can lead to fouling and flux rates less than about 6 GFD can lead to low permeate quality. Similarly, second pass reverse osmosis membranes 114 should be suitable for treatment of water having a pH of about 5 to about 7.5 and flux rates of about 12 to about 20 GFD. Suitable membranes include the FILMTEC™ BW30-365 membrane available from FILMTEC™, a subsidiary of The Dow Chemical Corporation, Midland, Mich. It can be particularly advantageous to use polyamide-based thin film composite reverse osmosis membranes. Such membranes have a high resistance to pH condition-induced degradation over a broad range of pH values; provide high flux and rejection; and have a high resistance to fouling (see, e.g., FILMTEC™ *Brackish Water Performance Data*, Form No. 609-00485-704, the entire contents of which are incorporated herein by reference, or other product literature). The membranes can be installed in separation apparatus such as, for example, those commercially available from USFilter Corporation, Warrendale, Pa.

In some embodiments, an ion exchange unit 136 receives second permeate 132 from second pass reverse osmosis system 114. Ion exchange unit 136 can include anionic and cationic ion exchange resins that attract and bind residual charged species in the treated water. The ion exchange resin can be present in mixed- or separate-bed configurations in any suitable arrangement to further purify the treated water. For example, the cation and anion resins can be arranged in a separate bed configuration with a cation bed followed by a anion bed in series. Examples of suitable ion exchange resins include the DOWEX™ MARATHON™ resin family, available from The Dow Chemical Corporation, Midland, Mich., as well as the AMBERLITE™ resin family available from Rohm and Haas Company, Philadelphia, Pa.

The pumps, piping, sensors, and control systems associated with moving fluids through system 100 are well known to those of ordinary skill in the art and, consequently, are not specifically discussed.

Example

The following example is intended to illustrate the benefits of the present invention, but does not exemplify the full scope of the invention. Thus, this example does not limit the claimed invention.

Figure 6:
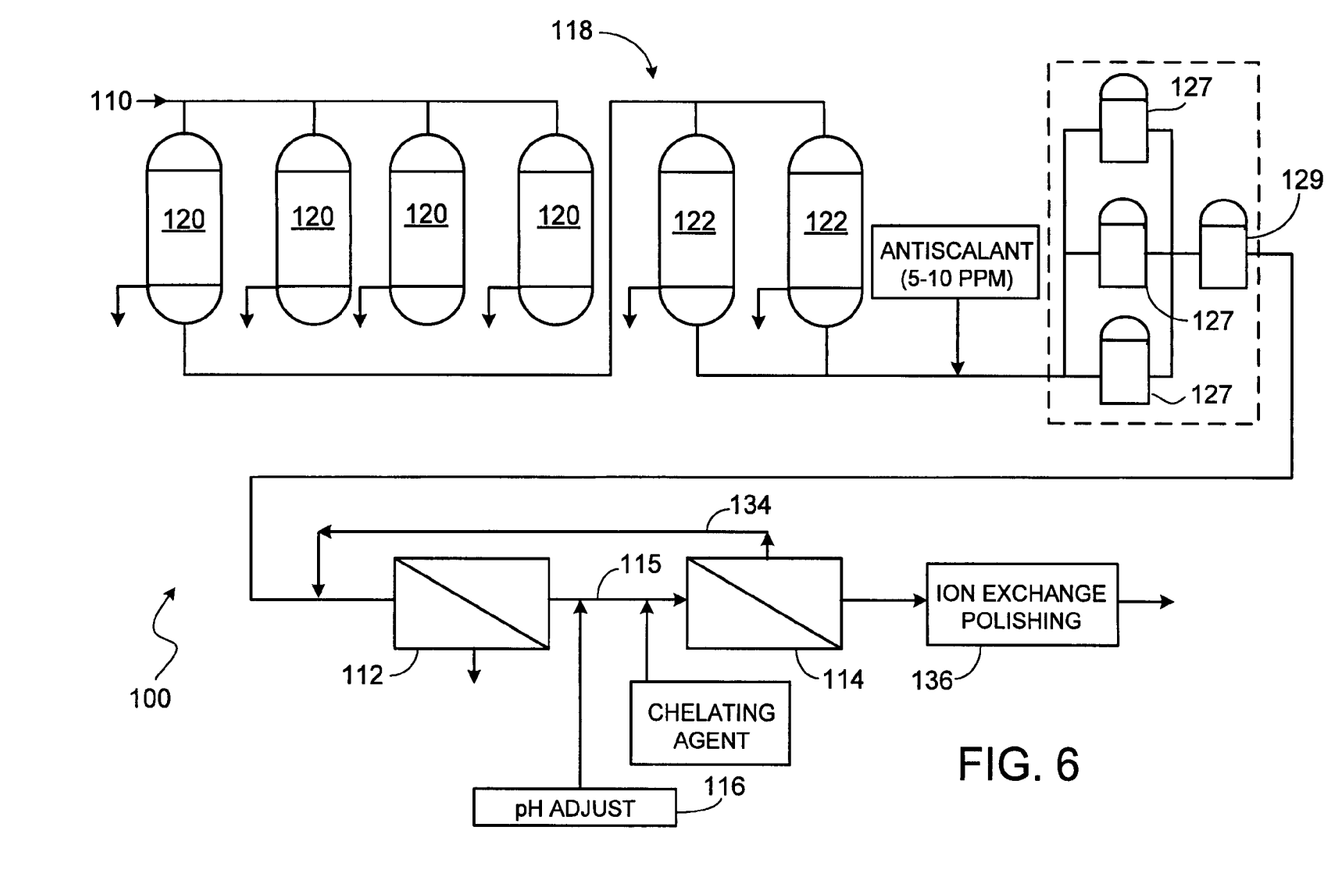
FIG. 6 is a specific embodiment of a system for implementing the method of FIG. 1.
Figure 7:
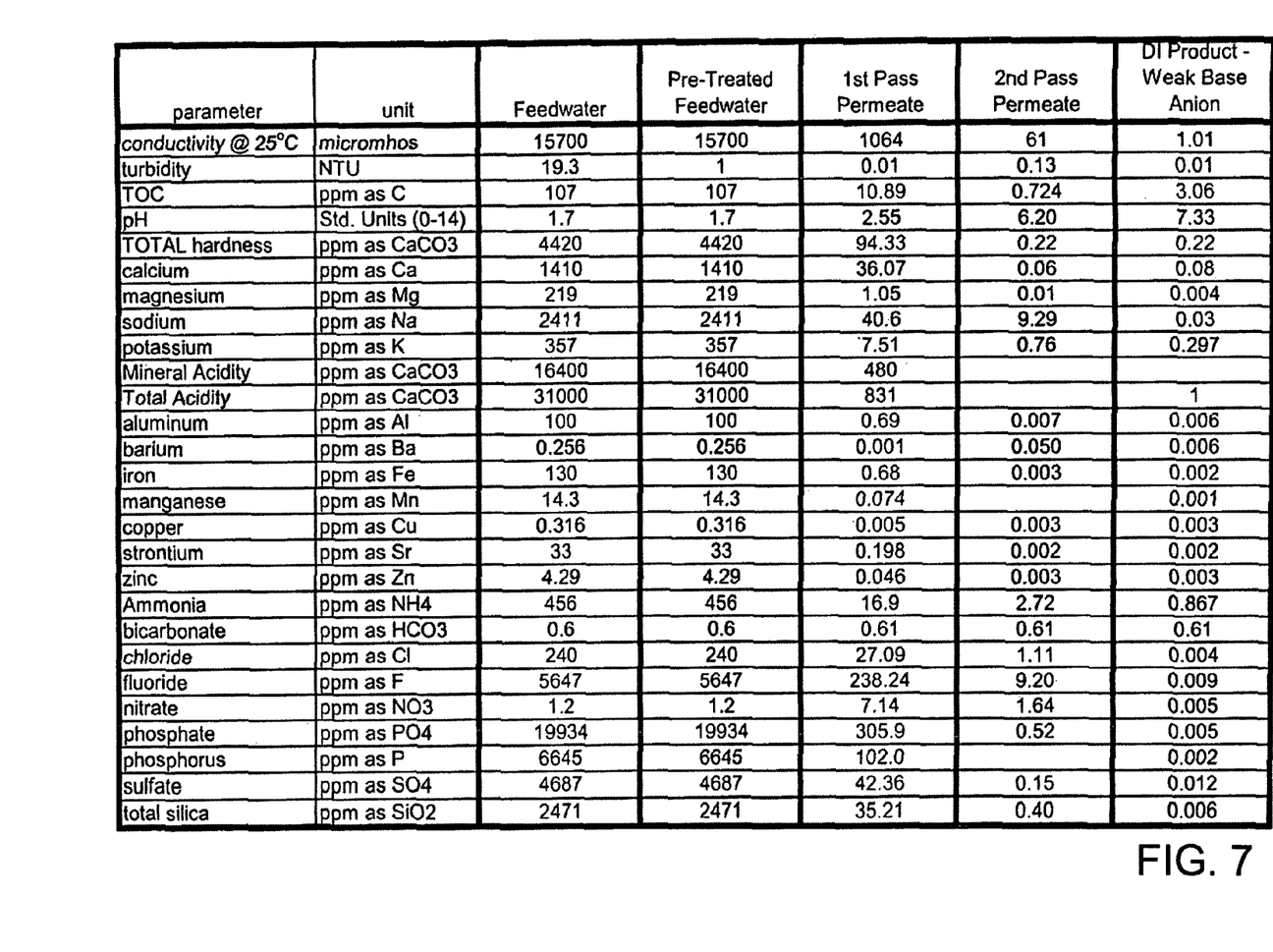
FIG. 7 is a table listing chemical constituents of water treated by the system of FIG. 6 at various points in the system.

Referring to FIG. 6, this example further details one specific implementation of method 10 using an illustrative embodiment of system 100. In this embodiment, system 100 was used to treat water stored in ponds that accumulated process/product water at a phosphate manufacturing facility. Influent water 110 typically had constituent concentrations as listed in FIG. 7. FIG. 7 also lists constituent concentrations at various points in system 100. System 100 also included a pretreatment system 118, first and second pass reverse osmosis membranes 112, 114, and an ion exchange polishing unit 136. Under typical operating conditions, approximately 135 gallons per minute (gpm) of water was directed from storage ponds (not shown) to a pretreatment system 118 that included first and second stage multimedia filters 120, 122 and cartridge filter unit 126. Four first stage multimedia filters 120 were arranged in parallel. Effluent from first stage multimedia filters 120 was combined and fed to two second stage multimedia filters 122, arranged in parallel. Both first and second stage filters 120, 122 used media comprised of anthracite, sand, and garnet to reduce the turbidity of the water to less than about 2 NTU and to reduce the SDI to less than about 4. The media is layered with the anthracite on top followed by sand (in both first and second stage filters 120, 122) and then garnet (only in the second stage filters). A chemical feed pump added an antiscalant, the sodium salt of phosphonomethylated diamine, commercially available from Nalco Chemical as EL-5300, between the second stage multimedia filters 122 and the cartridge filter unit 126 in amounts calculated to result in antiscalant concentrations between about 5 and about 10 ppm. Cartridge filter unit 126 included three 5-micron 12R×20 inch cartridge filters 127 arranged in parallel with each other that discharged to a single 1-micron 12R×30 inch cartridge filter 129. Cartridge filter unit 126 removed additional suspended solids including media leaking from the second stage multimedia filters 122. Passage through cartridge filters 126 had the additional effect of thoroughly mixing the antiscalant into the water discharged from pretreatment unit 118.

As is discussed in more detail below, concentrate 134 from second pass reverse osmosis membranes 114 was added to water discharged from pretreatment unit 118 before the inlet side of the first pass reverse osmosis system 112.

The first pass reverse osmosis system used FILMTEC™ BW30-365 membranes from FilmTec Corporation, a subsidiary of The Dow Chemical Corporation, Midland, Mich. and was operated at an average flux rate of about 5 to 7 GFD at about 250-300 psig operating pressure. Approximately 100 gpm of first pass concentrate is discharged from the first pass reverse osmosis apparatus back to the storage ponds. The second pass reverse osmosis system also used FILMTEC™

BW30-365 membranes and was operated at an average flux rate of about 18 GFD. A chemical feed pump added sodium hydroxide to the water stream after the first pass reverse osmosis apparatus and before introduction into the second pass reverse osmosis apparatus to raise the pH to between about 6.9 and about 7.1 although the system was observed to meet discharge specifications for ammonia, fluoride and phosphate with interpass pHs between about 6.5 and 7.2.

The recovery of the first pass RO is a function of the dissolved solids in the feed, e.g., the higher the recovery, the higher the dissolved solids in the reject stream, thus the higher the scaling potential is. For the influent water treated by the exemplary plant, the recovery was limited to about 30% with a feed water that varied between 13,900 and 22,400 μmho/cm conductivity.

A chemical feed pump 116 also added chelating agent ethylene diamine tetra acetic acid (EDTA) to first permeate 115 before it reaches second pass reverse osmosis system 114 in amounts calculated to result in concentrations between about 5 and about 10 ppm. Approximately 7 gpm of first concentrate is discharged from second pass reverse osmosis membrane back to the inlet side of first pass reverse osmosis system 112 and approximately 28 gpm of second permeate passes through to ion exchange polishing unit 136.

Ion exchange polishing unit 136 was configured with the cation and anion resins arranged in a separate bed configuration with a cation bed followed in series by a anion bed using DOWEX™ MARATHON™ A and DOWEX™ MARATHON™ C ion exchange resins, each available from The DOW Chemical Corporation, Midland, Mich. The mixed-bed polisher served to further control the concentration of ammonia to below about 1 mg/l and to reduce the concentration of phosphate species to below about 0.5 mg/l.

Because no other treatment processes were present, it was not anticipated that the pH of the water in the storage ponds would significantly change over time. Consequently, no mechanism was included for maintaining or lowering the pH of influent into the first pass reverse osmosis membranes.

Referring to FIG. 7, this system was used to successfully treat feedwater with a pH of 1.7 containing fluoride, total ammonia, and phosphorus at concentrations of 5647 ppm, 456 ppm, and 6645 ppm, respectively. As used herein, "successfully treated" is used to indicate reducing the concentrations of fluoride, total ammonia, and phosphorus to below 8 ppm, 1 ppm, and 0.5 ppm, respectively, before discharge with a discharge pH of between 6.5 and 8.5. It should be noted that discharge criteria are site-specific. Influent feedwater also included substantial levels of calcium, magnesium, silica, and possibly organic materials, measured as total organic carbon, which have the potential to interfere with the reverse osmosis treatment process through chemical interactions or by causing scaling. The first pass reverse osmosis membranes significantly reduce the concentrations of most of the constituents of interest. However, calcium and fluoride are present in the first pass permeate at concentrations that potentially could cause scaling on the second pass reverse osmosis membranes under the higher pH conditions induced by the interpass caustic addition. Similarly, total hardness, silica, and organic carbon are present in the first pass permeate and the inorganic and organic mix of contaminants can cause fouling of the second pass membranes, particularly as the pH is elevated. Interpass addition of EDTA effectively prevented scale formation on the second pass reverse osmosis membranes.

Figure 8:
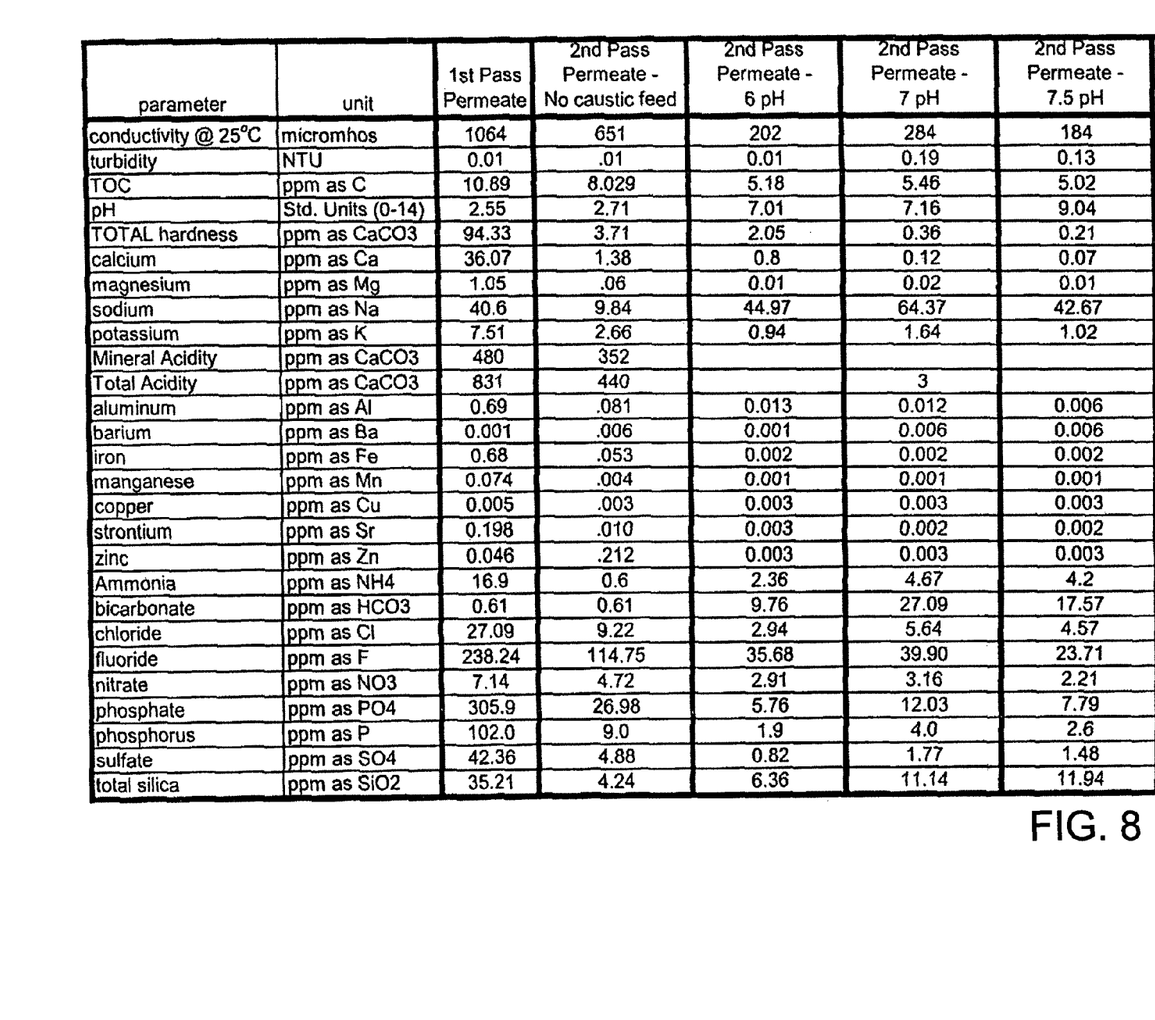
FIG. 8 is a table listing chemical constituents of water treated by the system of FIG. 6 with varying degrees of interpass pH adjustment.

Referring to FIG. 8, the adjustment of pH caused a large improvement on overall contaminant rejection in the second pass membranes. However, as discussed above, the increased pH causes an increased risk of fouling and scaling of the second stage membranes, particularly at desired high water recovery rates. It is believed the continuous addition of the chelating agent in this example was responsible for increasing the time between required membrane cleanings from the order of days with no chelating agent addition to the order of weeks with the addition of 5-50 ppm of EDTA.

A system as described above can be used to treat feedwater with a pH between about 0.5 and about 4.5 (e.g., between about 0.9 and 4.0), and individual constituents such as one or more of the following: organic materials, measured as total organic carbon, below about 500 ppm; calcium below about 1,300 ppm; iron below about 150 ppm; ammonia below about 750 ppm (e.g., below about 500 ppm); fluoride below about 7,500 ppm (e.g., below about 5,000 ppm); phosphorus below about 7,500 ppm (e.g., below about 7,000 ppm); and total silica below about 3,000 ppm.

Other Embodiments

A number of embodiments of the invention have been described. Nevertheless, it will be understood that various modifications can be made without departing from the spirit and scope of the invention. For example, the pretreatment systems described herein could include a clarifier having ballasted flocculation subsystems. Accordingly, other embodiments are within the scope of the following claims.

What is claimed is:

1. A method of removing constituents from water having a pH below about 4.5, the method comprising:
    directing the water to a first pass reverse osmosis membrane;
    separating the water into a first permeate and a first concentrate using the first pass reverse osmosis membrane;
    raising a pH of the first permeate to between about 5.5 and 7.5;
    adding a chelating agent to the first permeate;
    directing the first permeate, having said chelating agent and said pH of between about 5.5 and 7.5, to a second pass reverse osmosis membrane;
    monitoring the second pass reverse osmosis membrane for an indication of an accumulation of solid material and increasing the chelating agent being added to the first permeate in response to the accumulation of solid material on the second pass reverse osmosis membrane; and
    separating the first permeate into a second permeate and a second concentrate using said second pass reverse osmosis membrane, thereby separating the constituents from the water.

2. The method of claim 1, wherein the chelating agent comprises ethylenediaminetetraacetic acid.

3. The method of claim 1, wherein the constituents comprise at least ammonia, fluoride, and phosphate species.

4. The method of claim 3, wherein the constituents further comprise at least one of calcium, magnesium, and silica at concentrations in the water above 100 parts per million.

5. The method of claim 4, wherein at least one of fluoride, calcium, magnesium, and silica are present at concentrations in the first permeate above about 10 parts per million.

6. The method of claim 1, wherein the pH of the water is below 3.5.

7. The method of claim 1, wherein the pH is raised to between about 6.5 and 7.5.

8. The method of claim 1, wherein the pH is raised to between about 5.5 and 6.0.

9. The method of claim 1, wherein raising the pH of the first permeate comprises adding an alkali to the first permeate.

10. The method of claim 9, wherein the alkali comprises sodium hydroxide.

11. The method of claim 1, wherein separating the first permeate comprises concentrating one or more of ammonia, fluoride, and phosphate species in the second concentrate.

12. The method of claim 1, further comprising adding at least a portion of the second concentrate to the water directed to the first pass reverse osmosis membrane.

13. The method of claim 1, wherein pre-treating the water comprises reducing the concentration of suspended solids in the water.

14. The method of claim 13, wherein reducing the concentration of suspended solids comprises passing the water through one or more media filters.

15. The method of claim 14, wherein reducing the concentration of suspended solids further comprises adding a coagulant to the water before passing the water through the filters.

16. The method of claim 1, further comprising passing the second permeate through an ion exchange system.

17. The method of claim 1, further comprising adding an antiscalant to the water before the first pass reverse osmosis membrane.

18. The method of claim 17, wherein the antiscalant comprises a sodium salt of phosphonomethylated diamine.

19. The method of claim 1, wherein directing the water to a first pass reverse osmosis membrane comprises directing phosphate manufacturing process wastewater to the first pass reverse osmosis membrane.

20. The method of claim 19, wherein the phosphate manufacturing process wastewater has phosphate concentrations between 14,000 and 22,000 mg/l.

* * * * *

UNITED STATES PATENT AND TRADEMARK OFFICE
CERTIFICATE OF CORRECTION

PATENT NO. : 8,206,592 B2
APPLICATION NO. : 11/303160
DATED : June 26, 2012
INVENTOR(S) : John F. Bossler et al.

It is certified that error appears in the above-identified patent and that said Letters Patent is hereby corrected as shown below:

In the Claims:

Column 12, Line 62, in Claim 7, "the pH" should be replaced with --the pH of the first permeate--

Column 12, Line 64, in Claim 8, "the pH" should be replaced with --the pH of the first permeate--

Column 13, Line 9, in Claim 13, "wherein pre-treating the water comprises" should be replaced with --further comprising pre-treating the water by--

Signed and Sealed this
Sixteenth Day of October, 2012

David J. Kappos
*Director of the United States Patent and Trademark Office*